United States Patent
Miller et al.

(10) Patent No.: US 8,213,929 B2
(45) Date of Patent: Jul. 3, 2012

(54) NON-INTERFERING UTILIZATION OF NON-GEOSTATIONARY SATELLITE FREQUENCY BAND FOR GEOSTATIONARY SATELLITE COMMUNICATION

(75) Inventors: Mark J. Miller, Vista, CA (US); John C. Tchorz, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 13/276,210

(22) Filed: Oct. 18, 2011

(65) Prior Publication Data
US 2012/0034866 A1    Feb. 9, 2012

Related U.S. Application Data

(63) Continuation of application No. 12/248,714, filed on Oct. 9, 2008, now Pat. No. 8,068,827.

(60) Provisional application No. 60/978,549, filed on Oct. 9, 2007.

(51) Int. Cl.
*H04W 4/00* (2009.01)
(52) U.S. Cl. ............... 455/427; 455/3.02; 455/12.1
(58) Field of Classification Search ............ 455/12.1, 455/13.2, 98, 427, 404.1, 404.2, 456.1, 3.02
See application file for complete search history.

(56) References Cited

U.S. PATENT DOCUMENTS

| | | | |
|---|---|---|---|
| 5,708,963 A * | 1/1998 | Mobley et al. | 455/12.1 |
| 5,754,139 A | 5/1998 | Turcotte et al. | |
| 6,011,951 A | 1/2000 | King et al. | |
| 6,236,834 B1 | 5/2001 | Poskett et al. | |
| 6,498,937 B1 * | 12/2002 | Smith | 455/522 |
| 6,678,520 B1 | 1/2004 | Wang | |
| 6,866,231 B2 | 3/2005 | Higgins | |
| 7,027,786 B1 * | 4/2006 | Smith et al. | 455/139 |
| 7,136,620 B2 | 11/2006 | Wang | |
| 7,398,050 B2 * | 7/2008 | Walker | 455/3.02 |

(Continued)

FOREIGN PATENT DOCUMENTS

EP    0 569 693 A1    11/1993

(Continued)

OTHER PUBLICATIONS

Bender, Raymond G. Jr., Counsel for Lockheed Martin Corporation, Re Application of Lockheed Martin Corporation for Authority to Launch and Operate a Global Satellite Communications System in Geostationary Orbit—Stop Code: 0800, Letter to the Federal Communications Commission submitting an application to launch and operate the Astrolink-Phase II™ Satellite Communications System, Dec. 22, 1997, 184 pages.

(Continued)

*Primary Examiner* — Dominic E Rego
(74) *Attorney, Agent, or Firm* — Kilpatrick Townsend & Stockton LLP

(57) ABSTRACT

A method, satellite and system utilizes non-geostationary satellite orbit (NGSO) frequency spectrum in geostationary satellite orbit (GSO) satellite communication in a non-interfering manner. A ground station transmits signals to a GSO satellite using a GSO frequency band and an extended frequency spectrum including the an NGSO frequency band whenever a noninterference situation exists, i.e., when an NGSO satellite is not in-line between the earth terminal and the GSO satellite or when the NGSO satellite is not utilizing the NGSO band of interest. A command module is provided to instruct the ground station to transmit signals to the GSO satellite using the GSO frequency band and the extended frequency spectrum.

17 Claims, 8 Drawing Sheets

U.S. PATENT DOCUMENTS

| | | | |
|---|---|---|---|
| 7,526,249 B2* | 4/2009 | Waltman et al. | 455/12.1 |
| 8,068,827 B2 | 11/2011 | Miller et al. | |
| 2004/0087271 A1* | 5/2004 | Chang et al. | 455/13.3 |
| 2004/0110467 A1 | 6/2004 | Wang | |
| 2005/0277382 A1* | 12/2005 | Walker | 455/3.02 |

FOREIGN PATENT DOCUMENTS

| | | |
|---|---|---|
| EP | 0 748 065 A2 | 12/1996 |
| EP | 0 748 065 A3 | 1/1998 |
| EP | 0961420 A1 | 12/1999 |
| RU | 2 137 304 C1 | 9/1999 |
| RU | 2 153 226 C2 | 7/2000 |
| WO | 98/14026 A1 | 4/1998 |
| WO | 2007/056270 A1 | 5/2007 |
| WO | WO 2009/049090 A1 | 4/2009 |

OTHER PUBLICATIONS

Notice of Allowance mailed Sep. 19, 2011 from U.S. Appl. No. 12/248,714.

International Search Report and Written Opinion Corresponding to PCT Application No. PCT/US2008/079415, dated Feb. 24, 2009, 6 pages total.

Doiron, Steven, Senior Director, Regulatory Affairs for Hughes Network Systems, LLC, In re the matter of Hughes Network Systems, LLC, Letter of Intent to the Federal Communications Commission to Access the U.S. Market Using a Non-U.S. Licensed Ka-Band Geostationary Fixed-Satellite Service Satellite at the 107.1° W.L. Orbital Location, Nov. 9, 2009, 35 pages.

@Contact, LLC, FCC Application for Space and Earth Station, File No. SAT-AMD-20031030-00317, Oct. 30, 2003, 7:30:57:803AM, 18 pages.

Northrop Grumman Space & Mission Systems Corp., FCC Application for Space and Earth Station, File No. SAT-AMD-20040719-00136, Jul. 19, 2004, 7:59:54:896PM, 50 pages.

contactMEO Communications, LLC, FCC Application for Space and Earth Station, File No. SAT-AMD-20040322-00057, Mar. 22, 2004 4:09:29:910PM, 113 pages.

Northrop Grumman Space & Mission Systems Corp., FCC Application for Space and Earth Station, File No. SAT-AMD-20040312-00030, Mar. 12, 2004, 5:47:14:513PM, 119 pages.

contactMEO Communications, LLC, FCC Application for Space and Earth Station, File No. SAT-AMD-20040719-00141, Jul. 19, 2004 9:36:19:810PM, 43 pages.

Northrop Grumman Space & Mission Systems Corp., FCC Application for Space and Earth Station, File No. SAT-AMD-20031104-00324, Nov. 4, 2003, 4:56:19:653PM, 19 pages.

contactMEO Communications, LLC, FCC Application for Space and Earth Station, File No. SAT-AMD-20051118-00243, Nov. 18, 2005 5:28:08:486PM, 29 pages.

Baruch, Stephen D., attorney for TRW, Inc., Letter to Federal Communications Commission International Bureau, Satellites, Re: Amendment to Application of TRW Inc. For Authority to Launch and Operate a Global Satellite System Employing Geostationary and Non-geostationary Satellites in the Fixed-Satellite Service, Dec. 22, 1997, 74 pages.

Coran, Stephen E., representative for @Contact, LLC, Letter to Federal Communications Commission, Re: @Contact, LLC File No. SAT-LOA-19971222-00222 Supplement to Application to Construct, Launch and Operate NGSO FSS System, May 21, 1999, 147 pages.

Northrop Grumman Space & Mission Systems Corp., FCC Application for Space and Earth Station, File No. SAT-AMD-20070209-00033, Feb. 9, 2007, 4:32:11:960PM, 63 pages.

Northrop Grumman Space & Mission Systems Corp., FCC Application for Space and Earth Station, File No. SAT-AMD-20051118-00227, Nov. 18, 2005, 2:46:50:636PM, 30 pages.

Notification of Decision to Grant for Russian Patent Application No. 2010118460/07 dated Mar. 1, 2012, 15 pages.

* cited by examiner

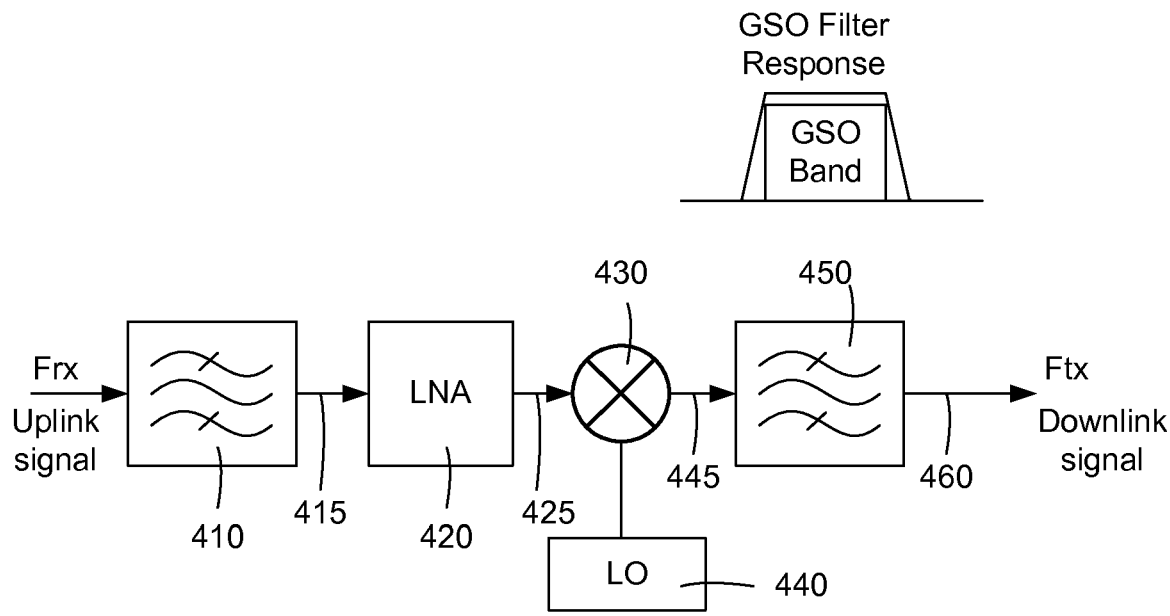
FIG. 4A (Prior Art)
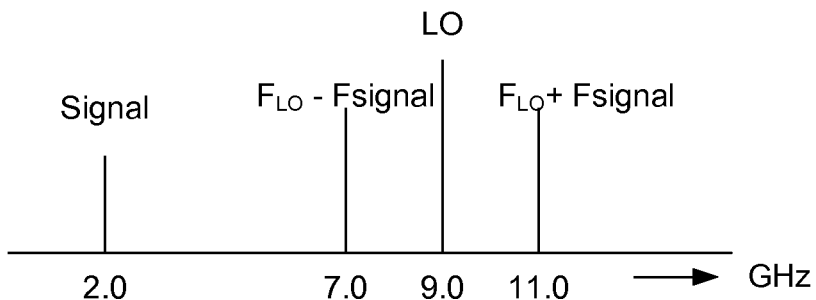
FIG. 4B
| Sum products | | | |
|---|---|---|---|
| LO = 9 GHz | | | |
| Frx = 2 GHz \ M \ N | 1 | 2 | 3 |
| 1 | 11.0 | 20.0 | 29.0 |
| 2 | 13.0 | 22.0 | 31.0 |
| 3 | 15.0 | 24.0 | 33.0 |
| Difference products | | | |
|---|---|---|---|
| LO = 9 GHz | | | |
| Frx = 2 GHz \ M \ N | 1 | 2 | 3 |
| 1 | 7.0 | 16.0 | 25.0 |
| 2 | 5.0 | 14.0 | 23.0 |
| 3 | 3.0 | 12.0 | 21.0 |
FIG. 4C

NON-INTERFERING UTILIZATION OF NON-GEOSTATIONARY SATELLITE FREQUENCY BAND FOR GEOSTATIONARY SATELLITE COMMUNICATION

CROSS-REFERENCES TO RELATED APPLICATIONS

This application is a continuation of and claims priority to U.S. patent application Ser. No. 12/248,714, entitled "Non-Interfering Utilization of Non-Geostationary Satellite Frequency Band for Geostationary Satellite Communication," filed Oct. 9, 2008, which claims priority to U.S. Provisional Application No. 60/978,549, entitled "Non-interfering Utilization of Non-Geostationary Satellite Frequency Band for Geostationary Satellite Communication," filed Oct. 9, 2007, each of which is hereby incorporated by reference in its entirety for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to satellite communication systems and, particularly to geostationary satellite systems that utilize non-geostationary satellite frequency spectrum in a non-interfering manner.

Satellites are either in geostationary orbit (GSO), i.e., stationary relative to the earth, or in non-geostationary orbit (NGSO), traveling around the earth. In general, the frequency bands allocated to GSO satellite communication systems do not overlap with the frequency bands allocated to NGSO satellite communication systems.

Radio frequency (RF) spectrum is a limited finite resource. Only certain frequency bands are allocated to GSO satellite communication systems. Some other frequency bands are allocated to NGSO satellite communication systems. Channel capacity of any communication system is limited by the number of frequency bands and the associated available bandwidth. There is a need for a GSO satellite system to utilize frequency bands allocated to other wireless communication systems in order to obtain higher channel capacity without causing any interference.

A GSO satellite is in orbit about 35,800 km above the equator, and its revolution around the earth is synchronized with the earth's rotation. Therefore, the GSO satellite appears stationary, i.e., fixed in the sky to an observer on the earth's surface. Unlike GSO satellites, NGSO satellites typically travel at low and medium altitudes and have variable orbits that are below the GSO orbit. A GSO Earth terminal with a narrow antenna beam width will have its antenna beam pointed at a GSO satellite. Thus, an NGSO satellite will only be visible to the GSO Earth terminal when it is "in-line" with respect to the GSO Earth terminal and the GSO satellite. Similarly, an NGSO ground station with a narrow antenna beam width will have its antenna beam pointed at the NGSO satellite. Since NGSO satellites are non-stationary, the NGSO ground station's antenna may be steerable in order to follow the NGSO satellite. The GSO satellite will only be visible to the NGSO ground station when the GSO and the NGSO satellites are "in-line" or approximately "in-line."

Prior art GSO satellite communication systems utilize only frequency bands that are allocated to GSO satellite systems. The allocated GSO frequency bands differ from those allocated to NGSO satellite systems in order to avoid interference. In certain allocated frequency spectra, the NGSO frequency bands may be allocated in proximity to the GSO frequency bands.

The GSO satellite may employ a multi-beam antenna that illuminates certain areas of the Earth's surface. Therefore, the beam cone of the satellite antenna is relatively wide in order to provide a large coverage area. By contrast, the cone shape of an uplink beam from an Earth terminal antenna to the GSO satellite is in general a very narrow beam. The beam (also referred to hereafter as a channel) relayed from a satellite to a controlling ground station a.k.a. an Earth terminal is called a downlink beam (or downlink channel) and the beam from the Earth terminal to the satellite is called an uplink beam (or uplink channel). Different frequency bands are allocated for the uplink channel and for the downlink channel to prevent co-channel interference. As the orbital trajectory of an NGSO satellite may cross the uplink or downlink channel of a GSO satellite communication system, frequency bands differing from the GSO frequency bands have in the past been allocated to the NGSO satellite. However, depending on the characteristics of the NGSO satellite constellation (e.g., low Earth orbit, medium Earth orbit), the time period during which the NGSO satellite is between the GSO satellite and the ground station, that is, whenever it is substantially "in-line" with the GSO satellite and the ground station of interest, is relative short, so that allocated NGSO frequency bands are temporally underutilized when the NGSO satellite is not in-line. Moreover, currently deployed NGSO satellites may not use certain allocated NGSO frequency bands for operation, so that those NGSO frequency bands are always underutilized.

BRIEF SUMMARY OF THE INVENTION

According to the invention, a geostationary satellite orbit (GSO) satellite communication system and associated method of use are provided for employing underutilized frequency bands of non-geostationary satellite orbit (NGSO) satellites in a non-interfering manner. The GSO satellite communication system is operative through a ground station to transmit signals to a GSO satellite using an extended frequency spectrum that includes both a GSO frequency band on a full-time basis and a non-geostationary (NGSO) frequency band on a time-shared basis. The GSO satellite communication system includes a command module that is operative to instruct the ground station to transmit signals to the GSO satellite using only the GSO frequency band whenever an NGSO satellite operating on an NGSO band of interest is expected to be substantially in-line between the ground station and the GSO satellite. The command module may be further operative to further instruct the ground station to transmit signals to the GSO satellite using the extended frequency spectrum whenever no NGSO satellite is expected to be substantially in-line between the ground station and the GSO satellite. The command module may be still further operative to further instruct the ground station to transmit to the GSO satellite using the extended frequency spectrum substantially continuously when no NGSO satellite operates in the NGSO frequency band of interest. The GSO satellite may comprise a receiver that is configured for receiving the transmitted signals utilizing the GSO frequency band and the extended frequency spectrum from one or more ground stations, the extended frequency spectrum including the GSO frequency band and a non-geostationary (NGSO) frequency band. The GSO satellite may further comprise a frequency mixer that converts the received transmitted signals to downlink signals and a power divider that applies the downlink signals to a bandpass filter bank. The bandpass filter bank may include first and second bandpass filters; the first bandpass filter being operative to pass signals within the bandwidth of the GSO frequency band and the second bandpass filter being operative to pass signals within the bandwidth of the extended frequency spectrum. The GSO satellite may further comprise a switch having a first input, a second input, and an output; the first input being coupled to the first bandpass filter output and the second input being coupled to the second bandpass filter output, and the output of the switch being selectively coupled to the first switch input or the second switch input. The GSO satellite may further comprise a control device configured to decode instructions transmitted from the command module and to couple the first or second input of the switch to its output according to decoded instructions.

In one embodiment of the present invention, the command center may comprise a data processing unit coupled with a memory. The memory may store orbital ephemeris data of one or more NGSO satellites.

In one embodiment of the present invention, the orbital ephemeris data may be carefully managed and updated by a GSO network management system.

In one embodiment of the present invention, the command center may be located at one location on earth.

In another embodiment of the present invention, the command center may be co-located within an Earth terminal.

In yet another embodiment of the present invention, the command center may be distributed among multiple locations on earth.

In one embodiment of the present invention, the GSO satellite system may use the extended frequency spectrum continuously (i.e., all the time) when the NGSO satellite system does not use the NGSO frequency band, i.e., when no interference will occur between the GSO and the NGSO satellite systems.

In yet another embodiment, the GSO satellite system may use the extended frequency spectrum all the time while the NGSO satellite does not operate in the NGSO frequency spectrum, and the GSO satellite system may not use the extended frequency spectrum at all when the NGSO satellite is operating in the NGSO frequency spectrum.

BRIEF DESCRIPTION OF THE DRAWINGS

FIG. 4A is a block diagram of a prior art satellite receiver subsystem.

FIG. 4B is a frequency plan illustrating the frequency products after a low level signal is mixed with a local oscillator frequency.

FIG. 4C is a table illustrating the sum and difference frequency products after a high level signal is mixed with a local oscillator frequency.

DETAILED DESCRIPTION OF THE INVENTION

Figure 1:
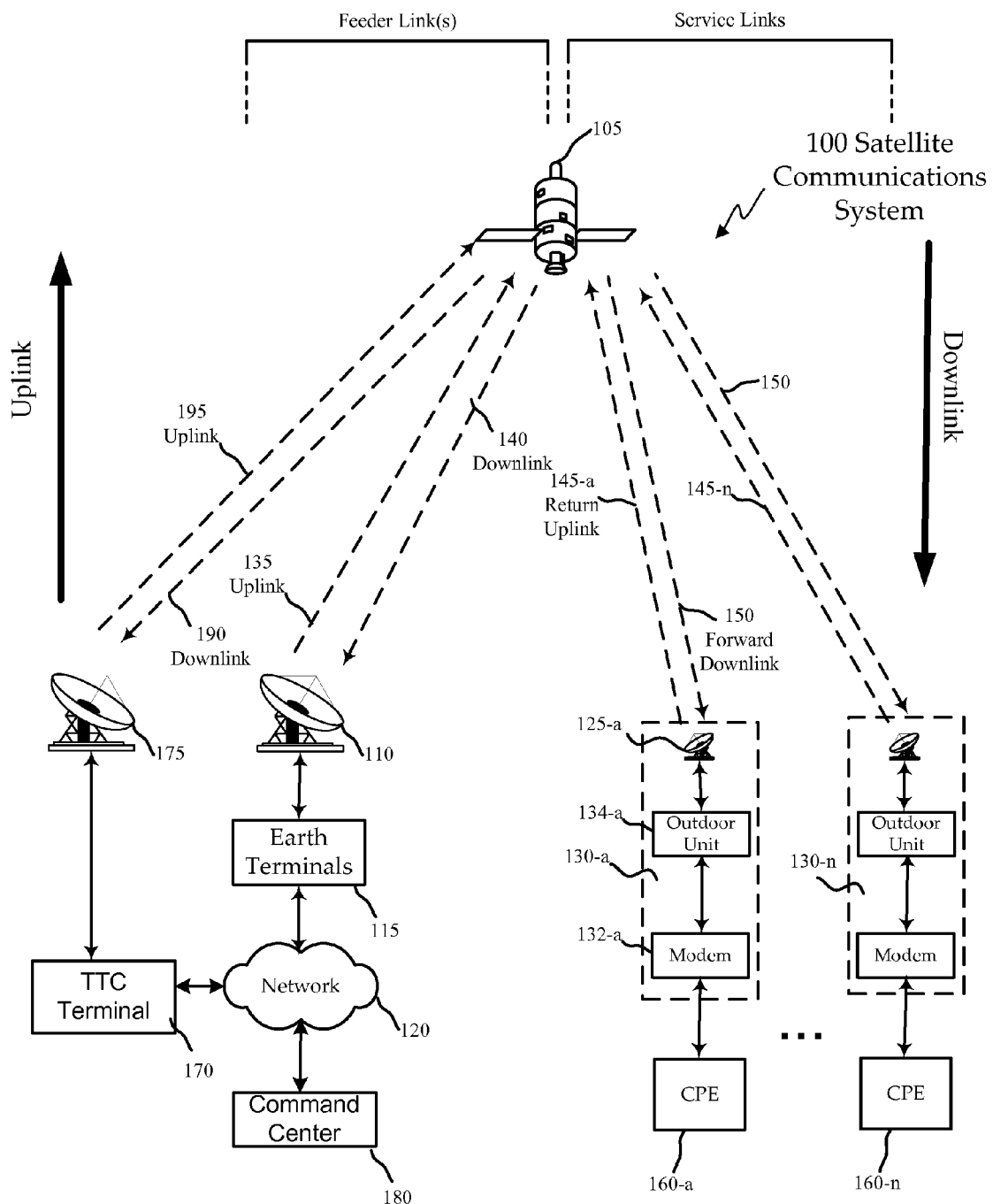
FIG. 1 is a block diagram of an exemplary satellite communications system configured according to various embodiments of the invention.

Referring first to FIG. 1, a block diagram of an exemplary satellite communications system 100 configured according to various embodiments of the invention is shown. The satellite communications system 100 includes a network 120, such as the Internet, interfaced with one or more Earth terminals 115 that is configured to communicate with one or more subscriber terminals 130, via a satellite 105. System 100 also includes one or more telemetry, tracking, and control (TTC) terminals 170.

The Earth terminal 115 is sometimes referred to as a hub, gateway terminal, or ground station and services the uplink 135, downlink 140 to and from the satellite 105. Although only one Earth terminal 115 is shown, this embodiment has a number of Earth terminals all coupled to the network 120, for example, twenty or forty Earth terminals. The Earth terminal 115 schedules traffic to the subscriber terminals 130, although other embodiments could perform scheduling in other parts of the satellite communication system 100.

A satellite communications system 100 applicable to various embodiments of the invention is broadly set forth herein. In this embodiment, there is a predetermined amount of frequency spectrum available for transmission. The communication links between the Earth terminals 115 and the satellite 105 may use the same or overlapping frequency spectrums with the communication links between the satellite 105 and the subscriber terminals 130 or could use different frequency spectrums.

The network 120 may be any type of network and can include, for example, the Internet, an IP network, an intranet, a wide-area network (WAN), a local-area network (LAN), a virtual private network (VPN), a virtual LAN (VLAN), a fiber optical network, a hybrid fiber-coax network, a cable network, the Public Switched Telephone Network (PSTN), the Public Switched Data Network (PSDN), a public land mobile network, and/or any other type of network supporting data communication between devices described herein, in different embodiments. The network 120 may include both wired and wireless connections, including optical links. As illustrated in a number of embodiments, the network may connect the Earth terminal 115 with other Earth terminals (not pictured), which are also in communication with the satellite 105. All Earth terminals in communication with the satellite 105 may also connect with a command center 180.

The Earth terminal 115 provides an interface between the network 120 and the satellite 105. The Earth terminal 115 may be configured to receive data and information directed to one or more subscriber terminals 130, and can format the data and information for delivery to the respective destination device via the satellite 105. Similarly, the Earth terminal 115 may be configured to receive signals from the satellite 105 (e.g., from one or more subscriber terminals 130) directed to a destination connected with the network 120, and can format the received signals for transmission with the network 120. The Earth terminal 115 may use a broadcast signal, with a modulation and coding ("modcode") format adapted for each packet to the link conditions of the terminal 130 or set of terminals 130 to which the packet is directed.

The command center 180 connected to the network 120 may communicate with each Earth terminal 115 in the network and the satellite 105. Earth terminals 115 may be generally located remote from the actual subscriber terminals 130 to enable frequency re-use.

The Earth terminal 115 may use an antenna 110 to transmit the uplink signal to the satellite 105. In one embodiment, the antenna 110 comprises a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, and low noise.

In one embodiment of the present invention, a geostationary satellite 105 is configured to receive the signals from the location of antenna 110 and within the frequency spectrum transmitted. The satellite 105 may, for example, use a reflector antenna, lens antenna, phased array antenna, active antenna, or other mechanism known in the art for reception of such signals. The signals received from the gateway 115 are amplified with a low-noise amplifier (LNA) and then frequency converted for changing the power levels and frequencies. The satellite 105 may process the signals received from the gateway 115 and forward the signal from the gateway 115 to one or more subscriber terminals 130. In one embodiment of the present invention, the frequency-converted signals are passed through a bank of filters that separate the various frequency-converted signals having different bandwidth. A switch may select one of the various frequency-converted signals, which is then further amplified by Traveling Wave Tube Amplifiers (TWTA) to produce the desired Equivalent Isotropically Radiated Power (EIRP) at the payload antenna output. The high-power transmission signal passed through a transmit reflector antenna (e.g., a phased array antenna) that forms the transmission radiation pattern (spot beam). In one embodiment of the present invention, the satellite 105 may operate in a multiple spot-beam mode, transmitting a number of narrow beams each directed at a different region of the earth, allowing for segregating subscriber terminals 130 into the various narrow beams.

In another embodiment of the present invention, the satellite 105 may be configured as a "bent pipe" satellite, wherein the satellite 105 may frequency and polarization convert the received carrier signals before retransmitting these signals to their destination, but otherwise perform little on the contents of the signals. A spot beam may use a single carrier, i.e., one frequency or a contiguous frequency range per beam. A variety of physical layer transmission modulation and coding techniques may be used by the satellite 105 in accordance with certain embodiments of the invention. Adaptive coding and modulation can be used in some embodiments of the present invention.

For other embodiments of the present invention, a number of network architectures consisting of space and ground segments may be used, in which the space segment is one or more satellites while the ground segment comprises of subscriber terminals, Earth terminals or gateways, network operations centers (NOCs) and a satellite and Earth terminals command center. The Earth terminals and the satellites can be connected via a mesh network or a star network, as evident to those skilled in the art. In one embodiment of the present invention, the command center 180 is connected to the network 120 and is operative to transmit instructions to the satellite and each participating Earth terminal in the GSO communication system. In another embodiment, the command center may be located at one geographical region and/or co-located with one of the Earth terminals 115. And yet in another embodiment, the command center may be distributed amongst multiple geographical regions and/or amongst several Earth terminals. In yet another embodiment, the command center may be mobile and coupled to the network through a cellular link or a wireless metropolitan (MAN) or a wide area network (WAN) link. The command center may be equipped with RF measurement equipment for measuring and evaluating interference characteristics.

The downlink signals may be transmitted from the satellite 105 to one or more subscriber terminals 130 and received with the respective subscriber antenna 125. In one embodiment, the antenna 125 and terminal 130 together comprise a very small aperture terminal (VSAT), with the antenna 125 measuring approximately 0.6 meter in diameter and having approximately 2 watts of power. In other embodiments, a variety of other types of antennas 125 may be used at the subscriber terminal 130 to receive the signal from the satellite 105. The link 150 from the satellite 105 to the subscriber terminals 130 may be referred to hereinafter as the forward downlink 150. Each of the subscriber terminals 130 may comprise a single user terminal or, alternatively, comprise a hub or router (not pictured) that is coupled to multiple user terminals. In one embodiment, subscriber terminal 130 may comprise a receiver including a bandpass filter bank adapted to let through a GSO frequency spectrum and an extended frequency spectrum. Each subscriber terminal 130 may be connected to various consumer premises equipment (CPE) 160 comprising, for example computers, local area networks, Internet appliances, wireless networks, etc.

TTC terminal 170 provides an interface for monitoring and controlling satellite 105. For example, TTC terminal 170 may receive status information from satellite 105, send commands to spacecraft 105, and track the position of satellite 105. In the present embodiment, TTC terminal 170 is connected to command center 180 via network 120, and TTC terminal 170 is configured to receive commands from command center 180 and to send information, such as the status of satellite 105, to command center 180. TTC terminal 170 may be an independent terminal, as shown in the figure, or may alternatively be implemented in a terminal 115 that also carries traffic data.

According to some alternative embodiments, TTC terminal 170 may be in direct communication with command center 180 or may be integrated into command center 180. TTC terminal 170 communicates with satellite 105 using an antenna 175. Antenna 175 may be substantially similar to antenna 110 or may comprise a different configuration. Uplink 195 represents a command uplink from TTC 115 for sending commands to satellite 105. Downlink 190 represents a telemetry downlink from satellite 105 for receiving data from satellite 105, such as data representing the position of satellite 105. TTC terminal 170 may be located remote from Earth terminals 115 and subscriber terminals 130. These links may be in-band with the user data links 135 and 140, or alternatively use another set of frequencies.

Figure 2:
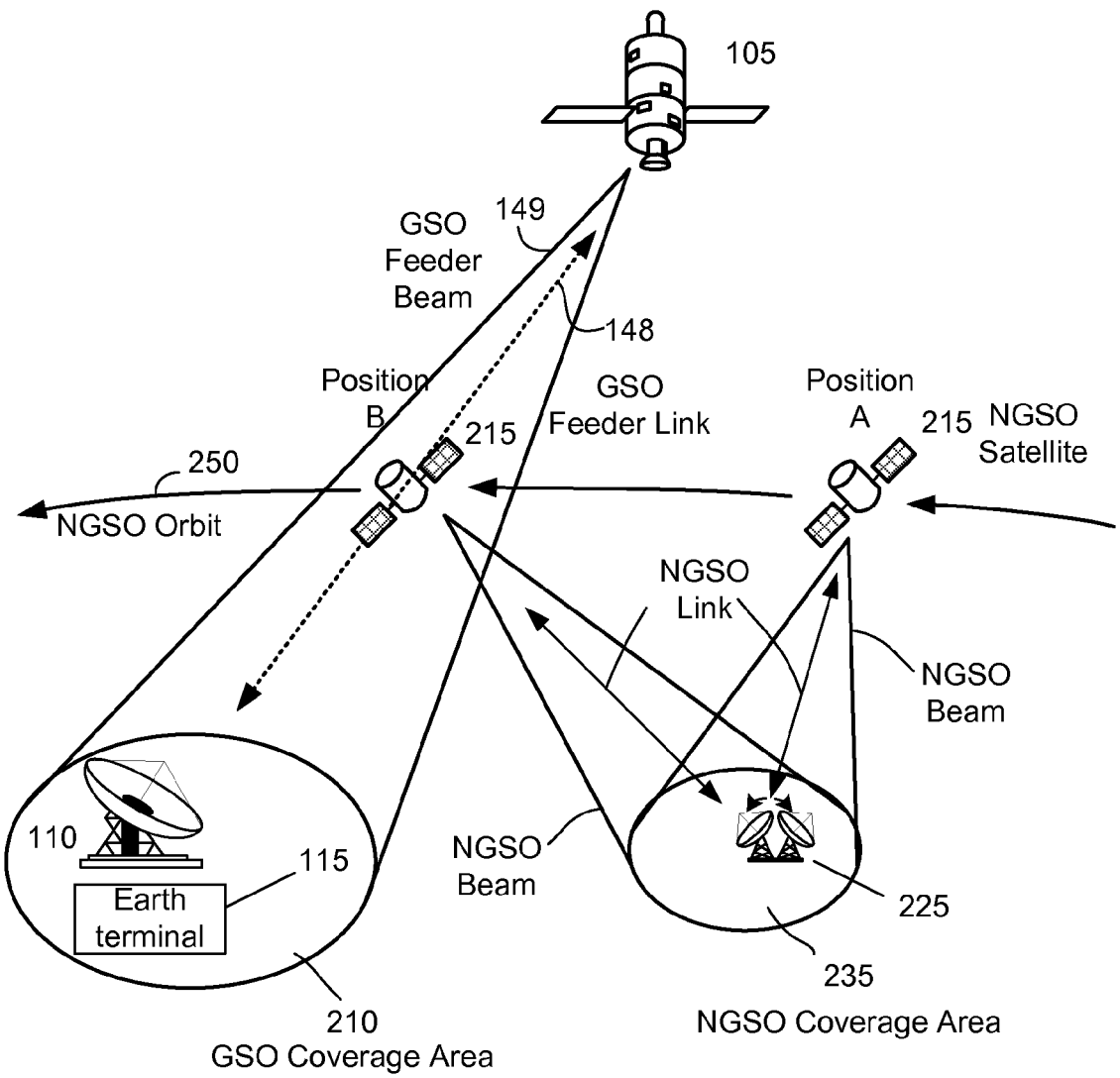
FIG. 2 is a block diagram illustrating an NGSO satellite moving along an NGSO orbit that is crossing the channel between a GSO Earth terminal and a GSO satellite.

In parallel to the development of GSO satellite communication systems, NGSO satellite based systems have been developed and deployed. As NGSO satellites travel in orbits below a GSO satellite, there may be periods where one or more NGSO satellites are "in-line" with the GSO satellite and one or more of the GSO Earth terminals. FIG. 2 is a block diagram illustrating NGSO satellite 215 moving along a non-geostationary orbit 250 that crosses the channel between the antenna 110 of the Earth terminal 115 and the satellite 105. The uplink beam of the antenna 110 is a narrow beam as it is targeting the GSO satellite 105. NGSO satellite 215 is in-line with respect to the Earth terminal's antenna 110 and the satellite 105 only a very short period of time when it travels the orbit 250, which crosses the channel between the antenna 110 and the satellite 105.

Interference may not occur in both uplink and downlink channels of the GSO satellite 105 and NGSO satellite 215 when the two satellites operate in different frequency spectrums. Interference may not occur when NGSO coverage area 235 is geographically apart from GSO satellite coverage area 210. Interference may not occur when NGSO ground stations use antennas 225 that are differently polarized than the Earth terminal antenna 110.

In order to extend the period that NGSO satellite 215 can illuminate NGSO coverage area 235, a spot beam of NGSO satellite 215 may continuously be steered over the NGSO coverage area 235, and each NGSO ground station within the NGSO coverage area also tracks the serving NGSO satellite as it moves across the NGSO coverage area. To ensure continuous coverage of NGSO area 235, an NGSO satellite constellation may have multiple NGSO satellites so that at least one of the multiple NGSO satellites will be visible at any time from the steerable antennas 225 of respective NGSO ground stations. Antennas 225 may be mechanically steerable or active phased-array ground terminal antennas.

NGSO satellites are generally designed to have variable transmitter power level so that a constant power flux density over each service area is achieved. For example, the transmitter power of a spot beam illuminating a certain NGSO coverage area is reduced when the NGSO satellite is traveling directly at or near the top (e.g., position A) of the illuminated NGSO coverage area, and the transmitter power will be increased when the NGSO satellite moves away from the coverage area 225. The transmitter power of NGSO ground station antennas may also be increased to compensate for path loss when the NGSO satellite moves away (e.g., position B) from the NGSO coverage area or when fading events occur (e.g., under rain or snow conditions). The NGSO satellite may interfere with the GSO Earth terminal 115 although its main antenna beam is pointed at the NGSO coverage area 235 that is geographically apart from the GSO Earth terminal because its side antenna beams may be pointing at the antenna 110.

Interference between the GSO satellite and the NGSO satellite can be mitigated when the GSO and NGSO satellites use different frequency spectrums. However, frequency spectrums available for satellite communications is very limited and there is a need for frequency spectrum sharing in order to use the available frequency spectrum more efficiently. The ITU Radio Regulations have been updated to allow NGSO systems to share parts of the Ku- and Ka-band spectrums with GSO satellite systems. In one embodiment of the present invention, a GSO satellite system exploits the fact that NGSO satellites may be in-line or approximately in-line with respect to the GSO satellite and one or more of the Earth terminals only for a relative short time period due to the narrow antenna beam of the Earth terminal pointing to the GSO satellite so that the NGSO frequency spectrum can be used in the GSO satellite communication system for the time period where NGSO satellites are not in in-line with respect to the Earth terminal and the GSO satellite.

Figure 3:
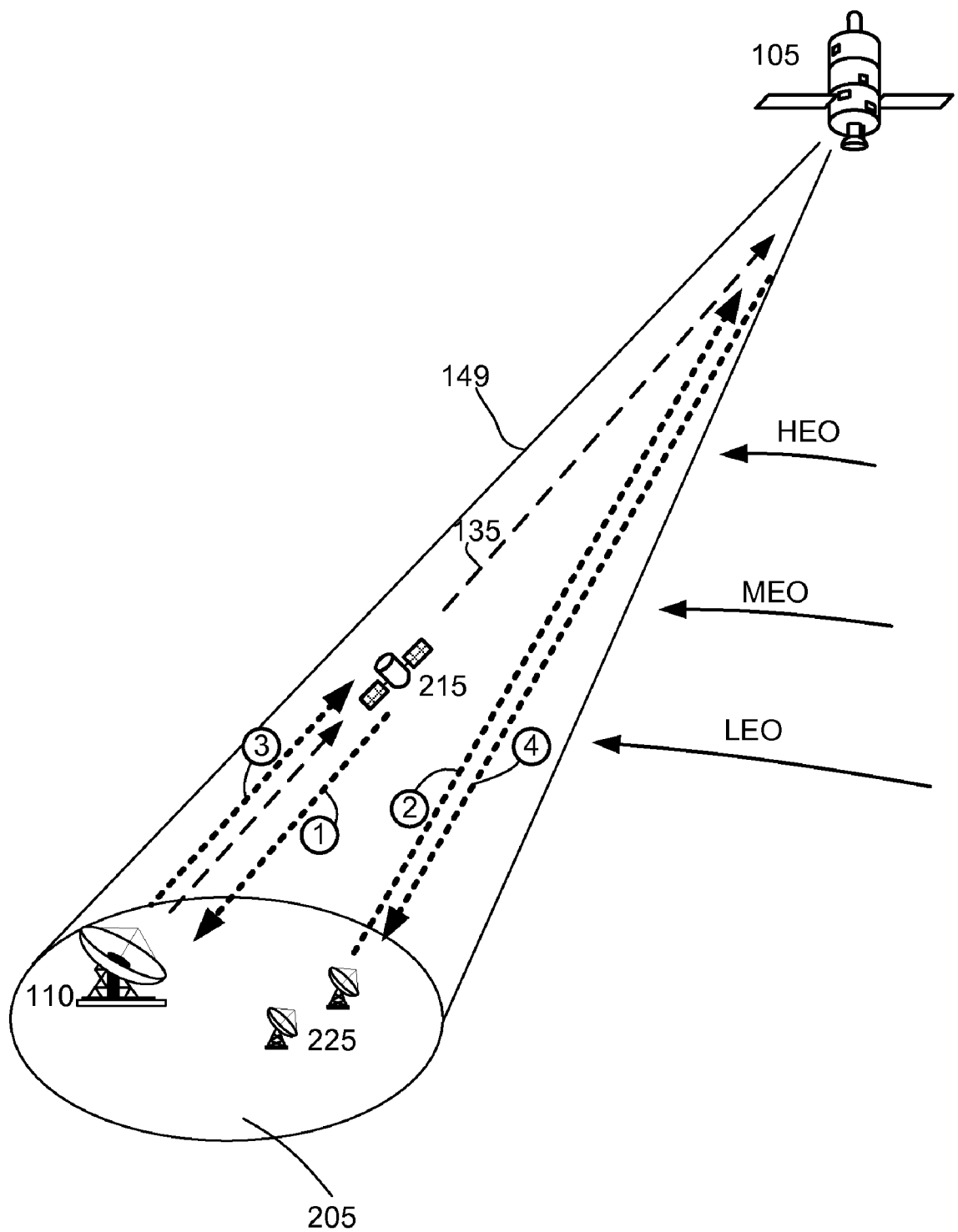
FIG. 3 is a block diagram illustrating different interference scenarios between a GSO satellite system and an NGSO satellite.

FIG. 3 is a block diagram illustrating different interference scenarios between a GSO satellite system and an NGSO satellite that is in-line or approximately in-line with respect to the Earth terminal and the GSO satellite. In the following description, "in-line" means that the NGSO satellite is positioned between the main beam of the Earth terminal's antenna 110 and the respective GSO satellite (as shown in FIG. 3) or alternatively that the GSO satellite is positioned between the NGSO satellite and the NGSO ground stations' antennas 225. "Interference" relates to frequency, phase, amplitude disturbance and/or any combination thereof caused by interaction between signals transmitted by the GSO and NGSO satellite systems. An example of the interference level or severity may be expressed by the carrier to interference power ratio (C/I). There are four interference scenarios: (1) The NGSO satellite is interfering with a GSO Earth terminal; (2) NGSO ground stations are interfering with the GSO satellite; (3) GSO Earth terminals are interfering with the NGSO satellite, and (4) The GSO satellite is interfering with an NGSO ground station.

The worst case interference scenario (1) may occur when the NGSO satellite is pointing its main antenna beam at an NGSO terminal that is located closely to the GSO Earth terminal. Interference scenario (1) may also occur when the main beam of the NGSO satellite is pointing to an NGSO ground station that is geographically apart from the GSO Earth terminals but the NGSO satellite antenna side beams are pointing at the GSO Earth terminal.

The worst case interference scenarios (2) and (4) may occur when the main beam of an NGSO ground station is pointing at the GSO satellite. And the worst case in interference scenario (3) may be when the main beam of the GSO antenna is pointing at the NGSO satellite. These four interference scenarios will be avoided or at least mitigated if the GSO satellite system does not use the NGSO frequency spectrum when an NGSO satellite is in-line. The interference severity can be measured using RF equipment, estimated using known data, or simulated using known simulation models. The carrier-to-interference power ratio is for example a parameter for determining the interference level. The GSO system must operate on a totally non-interference basis with the NGSO system. This requires that when the NGSO satellite is in-line or approximately in-line with respect to the Earth terminal and the GSO satellite, the GSO Earth terminal cannot transmit any signals towards the NGSO satellite utilizing the NGSO frequency spectrum since the transmitted signals would interfere with the desired NGSO ground station uplink signals. NGSO satellite systems can be low earth orbit (LEO) satellite systems, medium earth orbit (MEO) satellite systems, or high earth orbit (HEO) satellite systems. The interference level and/or the in-line duration may depend on the antenna characteristics, receiver sensitivity of the NGSO satellite in question, and its orbital altitude. According to some embodiments, if satellite 215 is a HEO satellite, satellite 215 may be in an orbit that is sometimes higher than the orbit of satellite 215. As a result, satellite 105 may pass between satellite 215 and antennas 225 of the NGSO ground stations, which may result in satellite 105 interfering with communications between satellite 215 and the NGSO ground stations if satellite 225 is using an extended frequency spectrum that includes the NGSO frequency spectrum.

When the GSO and NGSO satellites are not in-line, the NGSO spectrum is said to be "available" for utilization by the GSO satellite communication system. When the GSO and NGSO satellites are "in-line" or approximately "in-line", the NGSO spectrum is said to be "unavailable" for utilization by the GSO system. In one embodiment of the present invention, the GSO satellite design will incorporate at least two bandpass filters, which may be selected according to instructions received from a command center on earth. The selection of a bandpass filter having the appropriate bandwidth may be based on orbital ephemeris data that are maintained and updated by a GSO network management system (NMS). Earth terminals that are participating in the GSO satellite communication system may be capable of transmitting signals to the GSO satellite using a GSO frequency spectrum and an extended frequency spectrum. The extended spectrum includes the GSO frequency spectrum and an NGSO frequency spectrum. In another embodiment, the GSO satellite design may incorporate a control device on board that contains orbital ephemeris data. The on-board control device may select the appropriate bandpass filter based on the stored orbital ephemeris data. This design alternative is feasible if all frequency spectrums and orbital information of the NGSO system have been determined and remain unchanged during the life of the GSO satellite. When the NGSO spectrum is available, a bandpass filter with a bandwidth that passes the GSO and NGSO spectrums will be used. When the NGSO spectrum is not available, a bandpass filter with a narrower bandwidth that only lets the GSO spectrum through but attenuates the NGSO spectrum sufficiently will be used. This will reduce all emissions by the satellite in the NGSO band to a level that does not cause any downlink interference to the NGSO system. In addition, when the NGSO spectrum is unavailable, the Earth terminals of the GSO system will not use the NGSO frequency spectrum to prevent any significant radiation and interference to the NGSO satellites. During the short interval of NGSO spectrum unavailability, the GSO satellite communication system will operate in a reduced transmission capacity mode.

In one embodiment, the GSO satellite communication system uses its allocated GSO frequency spectrum in a primary basis. The GSO satellite communication system extends the allocated primary GSO frequency spectrum with an NGSO frequency spectrum in a secondary basis when the NGSO satellite is not in-line, and the spectrum extension can be operated in a non-interfering manner. In one embodiment, both the GSO and the NGSO satellite communication systems operate in a Ka-band. For example, the GSO primary uplink frequency spectrum may be 28.1 to 28.6 GHz, and the GSO primary downlink frequency spectrum may be 18.3 to 18.8 GHz. The NGSO uplink frequency spectrum may be 28.6 to 29.1 GHz and the NGSO downlink frequency spectrum may be 18.8 to 19.3 GHz.

In order to manage the interference events, orbital ephemeris data must be carefully managed and updated by the GSO network management system (NMS). When an interference event is anticipated, the NMS must have the capability to move all traffic to the GSO spectrum and select the appropriate bandpass filter. From a frequency reuse standpoint, the NGSO frequency spectrum would be an extension of the GSO operating frequency spectrum.

Generally a satellite receives an uplink signal transmitted from an Earth terminal at some frequency and converts it to a downlink signal at an offset transmit frequency. The downlink signal at the transmit frequency is then amplified for obtaining the downlink EIRPs. TWTA or solid state power amplifiers can be used. Different uplink and downlink frequencies are used so that they do not interfere with each other. The satellite RF subsystem includes a receiver bandpass filter 410 adapted to pass the desired uplink signal, a low noise amplifier 420 adapted to amplify the filtered uplink signal 415, a mixer 430 that down converts the uplink signal at frequency Frx by mixing it with a local oscillator 440, and a bandpass filter 450 that passes the desired frequency product 460 as shown in FIG. 4A. According to some embodiments, the satellite RF subsystem may include another filter (not shown) between the low noise amplifier 420 and mixer 430. Mixer 430 is a 3-port device that takes the input signal 425 (e.g., the amplified uplink signal) and the local oscillator signal 440 and frequency translates the uplink signal to a downlink signal. In most satellite communication, the downlink frequency signal is lower than the uplink frequency signal. If the signal level applied to the mixer is low, the mixed products may have two frequency products representing the sum ($F_{LO}+F_{rx}$) and the difference ($F_{LO}-F_{rx}$). If the signal level applied to the mixer is high, the resulting mixed products may have multiple harmonics consisting of every $M*F_{rx}\pm N*F_{LO}$ frequency product where M and N are integers. FIG. 4B is a block diagram illustrating the sum and difference products of an LO frequency of 9.0 GHz with a 2.0 GHz signal. The difference product is 7.0 GHz and the sum product is 11.0 GHz. FIG. 4C is a block diagram illustrating all of the possible sum and difference spectral products for M, N=1, 2, and 3. The difference product is 7.0 MHz and the sum product is 11.0 GHz for M=N=1.

Filter 450 is a bandpass filter that attenuates all of the undesired harmonics to a power level below the spectral emission requirements and let the desired frequency product pass through to the amplifiers (not shown).

Figure 5:
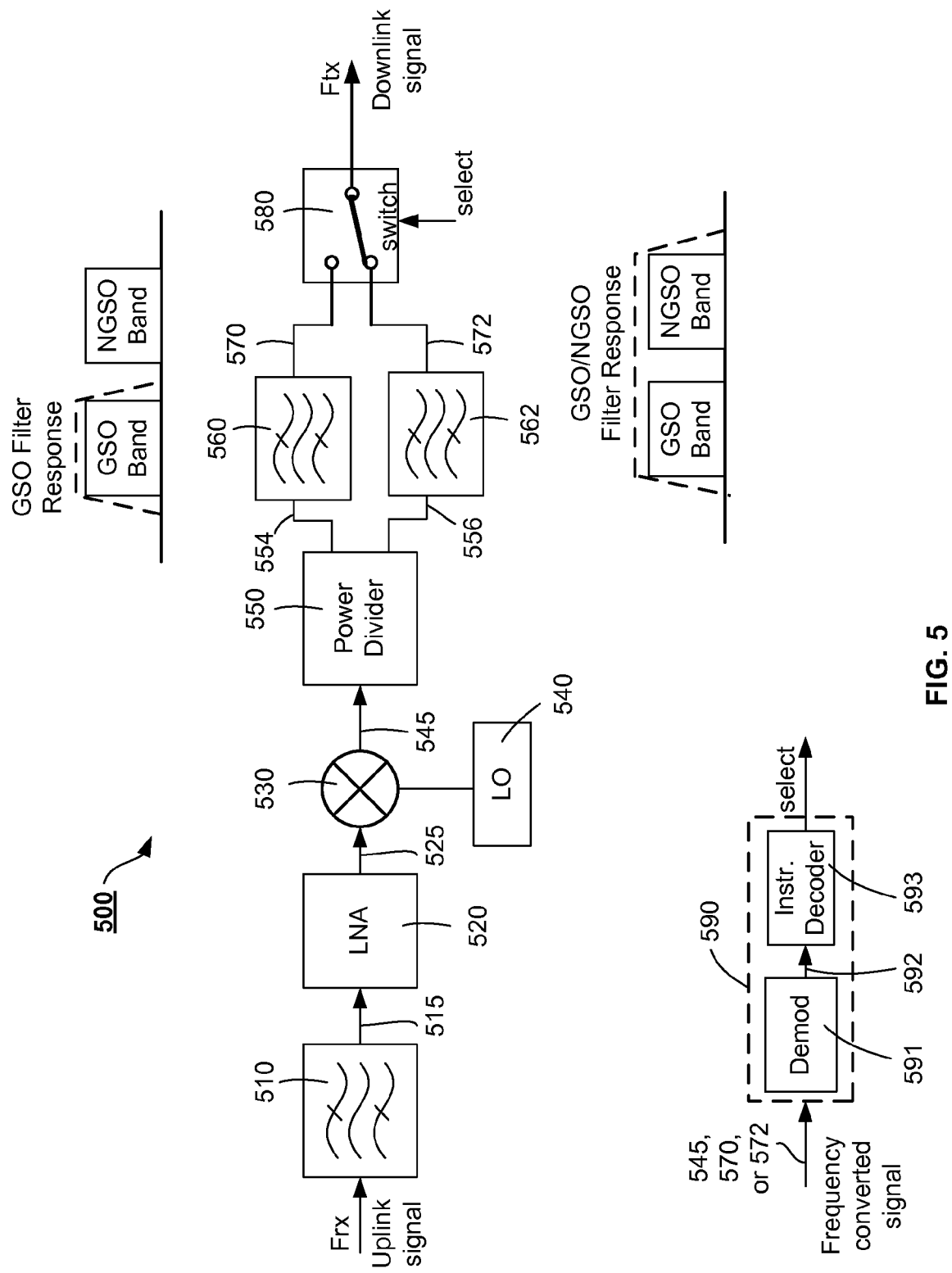
FIG. 5 is a block diagram of a GSO satellite receiver subsystem according to one embodiment of the present invention.

In one embodiment of the present invention, an exemplary design of the GSO satellite system utilizing the additional NGSO spectrum is shown in FIG. 5. The satellite RF receiver subsystem 500 comprises a receiver bandpass filter 510 that passes the composite GSO/NGSO uplink signal spectrum 515 and attenuates all other frequency components including the image of the uplink signal. The composite GSO/NGSO signal is then amplified by a low noise amplifier 520 and the amplified composite signal 525 is then applied to mixer 530, where the signal 525 is mixed with local oscillator 540 to produce multiple frequency products including a desired GSO downlink signal. According to some embodiments, the satellite RF subsystem may include another filter (not shown) between the low noise amplifier 520 and mixer 530. Mixer 530 may be a balanced mixer to cancel many mixer products due to the balance characteristics. The mixer may also be an image rejection mixer. LO 540 may be generated from an oven-controlled crystal oscillator (OCXO), which provides a very stable reference frequency. The multiple frequency products 545 are then divided into two paths 554 and 556 by power divider 550. In one embodiment, both paths 554 and 556 have the same power level. In one embodiment, the filter response of bandpass filter 560 has a bandwidth that lets the desired GSO downlink signal 570 through and the filter response of bandpass filter 562 has an extended bandwidth that lets the composite GSO/NGSO downlink signal 572 through. In one embodiment, bandpass filters 560 and 562 can be implemented with lumped L and C components, which provide wide bandwidth but moderate Q. In another embodiment, bandpass filters can be implemented using microstrips for achieving high Q. In yet another embodiment, bandpass filters can be implemented using high K ceramic materials for achieving even higher Q. The frequency responses of bandpass filters 560 and 562 are different. In one embodiment, bandpass filter 560 passes the GSO frequency spectrum but attenuates the NGSO frequency spectrum whereas bandpass filter 562 passes both GSO and NGSO frequency spectrums and attenuates all other frequencies. The desired bandwidth of the downlink signal can then be selected by switch 580. In one embodiment, switch 580 can be a PIN diode single-pole double-throw (SPDT) MMIC switch.

In one embodiment of the present invention, a control device 590 on-board the satellite is operative to demodulate the down-converted signal, extract relevant information from the demodulated signal, and decode instructions that are relevant for the operation of the receiver subsystem. The down-converted signal can be taken from the output 545 of the mixer 530, from the output 570 of the GSO bandpass filter 560, or from the output 572 of the GSO/NGSO bandpass filter 562 and demodulated by demodulator 591. One skilled in the art will recognize that the down-converted signal is not limited to only being taken from the output 545, from the output 570, or from the output 572 as illustrated in FIG. 5, and that the down-converted signal may be taken from other points in the receiver subsystem according to alternative embodiments of the present invention. Decoded instructions are then applied to corresponding components of the receiver subsystem. In one embodiment, instructions may include the selection of the desired bandpass filter. According to other embodiments of the present invention, instructions from the command center may not be transmitted in band as described in FIG. 6. For example, instructions from the command center may be transmitted to satellite 105 via a separate telemetry link, such as uplink 195 illustrated in FIG. 1. Where the command signals are not transmitted in band, additional hardware for processing signals carrying the instructions from the command center may be included in receiver subsystem 500.

Since the GSO satellite payload can dynamically operate over the NGSO frequency spectrum, it provides the GSO satellite communication system the capability to operate over spectrum that is otherwise not being used. In the case where the frequency spectrum has been allocated to the NGSO satellite system but is not used, it provides the GSO satellite communication system the capability to totally utilize that frequency spectrum. If and when that frequency spectrum is allocated and it is fully utilized by the NGSO satellite system, the GSO satellite system can be configured such that it will never operate over that frequency spectrum.

Because NGSO satellites are typically closer to the Earth's surface than GSO satellites, the necessary antenna size and transmission power level are often much smaller than those of GSO satellites, and the footprints of the NGSO satellites (coverage areas) are also much smaller than the GSO satellite coverage areas. In one embodiment of the present invention, the GSO satellite design may use the NGSO band flexibly and efficiently when the NGSO satellite system is operational but does not operate over a given coverage area that overlaps the GSO coverage area. In this case, the frequency spectrum of the GSO satellite system may be extended to include the NGSO frequency spectrum.

One of the primary factors of the NGSO spectrum availability to the GSO system is the directivity of both the GSO and NGSO systems. High antenna directivity results in narrow beam widths and confines transmitted and received spectral energy, the frequency of occurrences where the narrow beams are in-line is reduced. This is the case where spot-beam satellite systems are deployed. The satellite filter selectivity would be individually controllable for each narrow beam. For example, if a GSO satellite system were operating over the continental United States with a number of small directional antennas and an NGSO satellite was passing over the West coast, the East coast beams could continue to operate with the extended bandwidth that includes the NGSO frequency band since they are well out of the NGSO coverage area. In case where NGSO satellite systems utilize omni-directional antennas, they will likely interfere more frequently with a GSO satellite that utilizes the NGSO band, and hence, the GSO satellite can utilize the extended frequency band a much smaller fraction of time.

Figure 6:
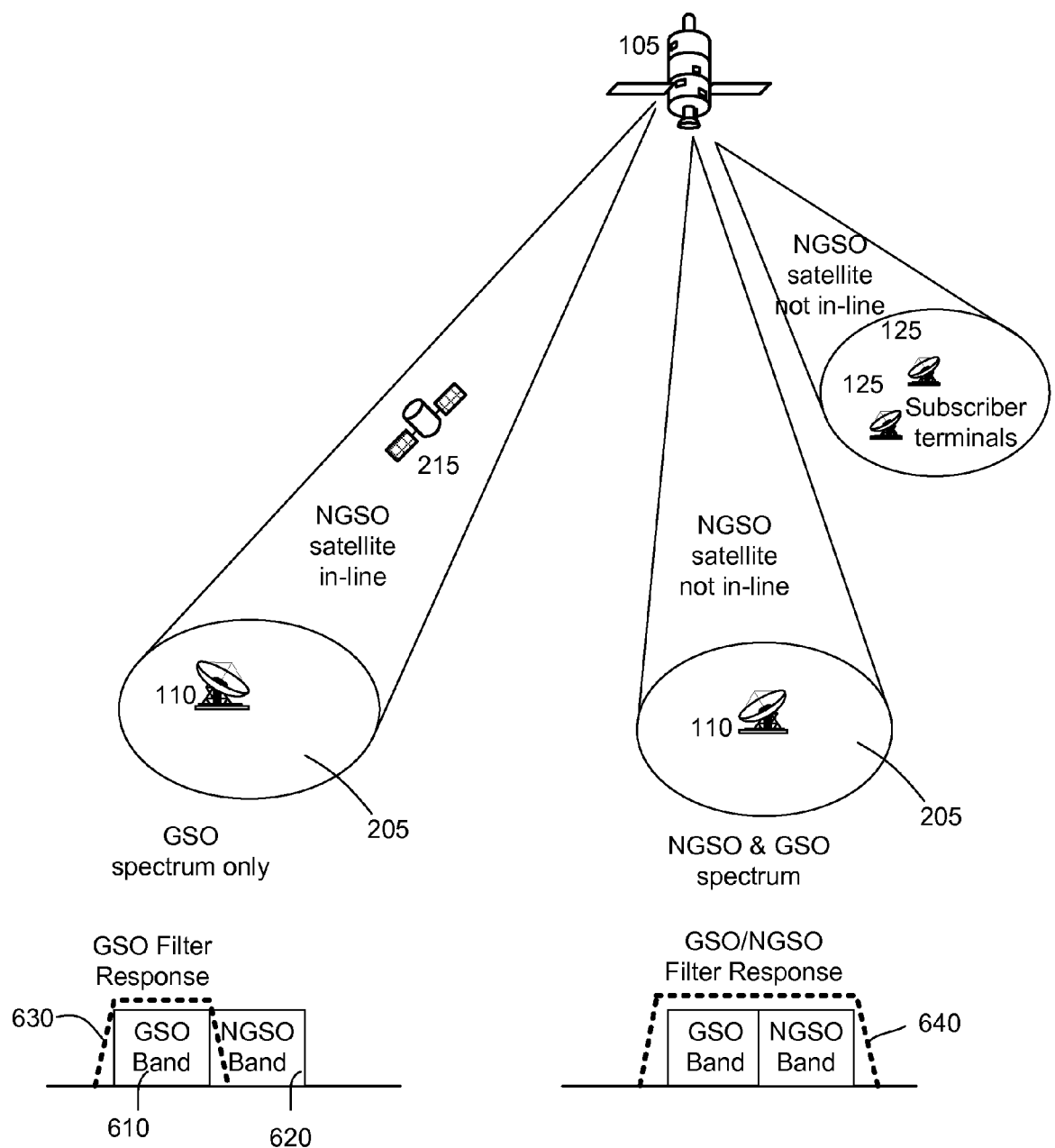
FIG. 6 is a block diagram illustrating a GSO satellite utilizing an extended frequency spectrum in a non-interfering manner, in accordance with one embodiment of the present invention.
Figure 8A:
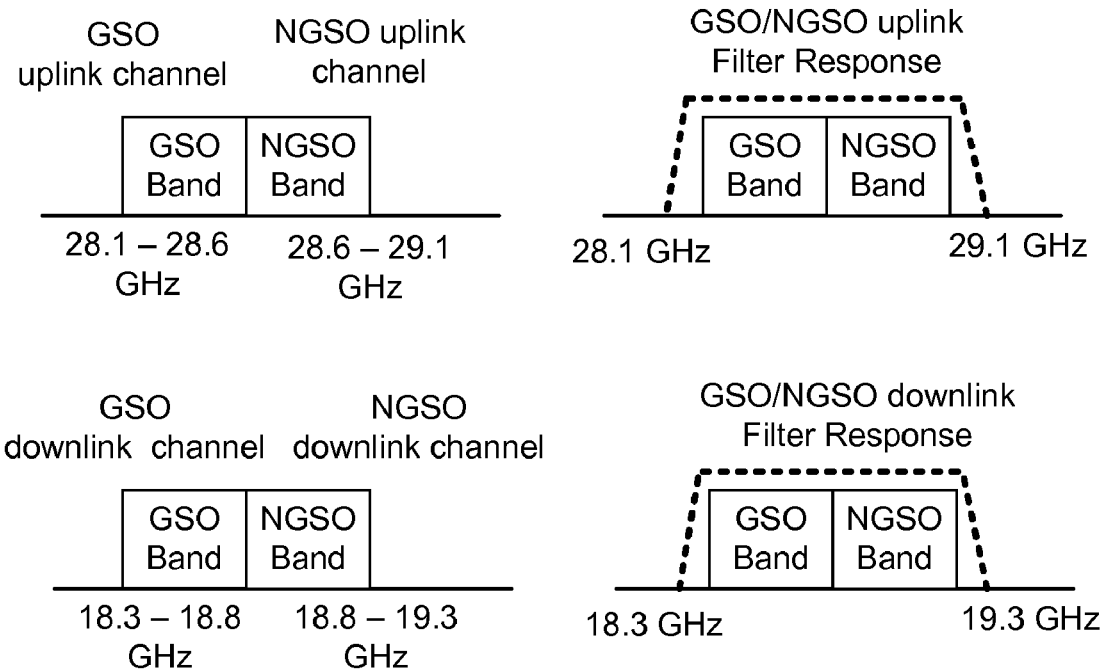
FIG. 8A is an extended filter response incorporated an NGSO frequency spectrum that is above the GSO frequency spectrum.
Figure 8B:
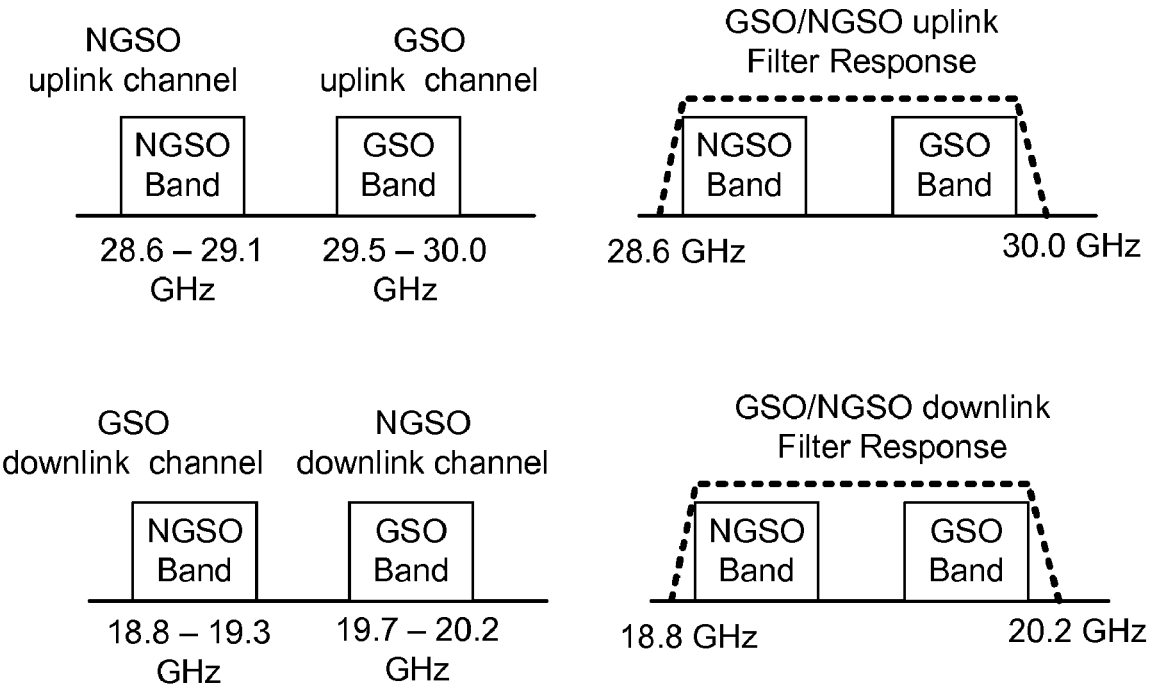
FIG. 8B is an extended filter response incorporated an NGSO frequency spectrum that is below the GSO frequency spectrum.

FIG. 6 is a block diagram illustrating a GSO satellite communication system that uses an extended frequency spectrum in a non-interference manner, in accordance with one embodiment of the present invention. The GSO Earth terminal and the GSO satellite may select the appropriate bandpass filter according to instructions received from the command center (not shown). GSO frequency band 610 is the primary frequency spectrum allocated to the GSO satellite communication system and NGSO frequency band 620 is the primary frequency spectrum allocated to the NGSO satellite communication system. When the NGSO satellite 215 is in-line with respect to the GSO Earth terminal (shown as antenna 110) and the GSO satellite, the command center will instruct the GSO Earth terminal and the GSO satellite 105 to use the GSO spectrum only, the use of the GSO spectrum is indicated by filter response 630. When the NGSO satellite 215 is not in-line with respect to the GSO Earth terminal and the GSO satellite, the command center will instruct the GSO Earth terminal and the satellite to use the extended frequency spectrum, which includes the GSO frequency spectrum 610 and NGSO frequency spectrum 620. The use of the extended frequency spectrum is indicated by filter response 640. Therefore, when the NGSO satellite is not in-line, subscriber terminals (shown as antennas 125) of the GSO satellite communication system can benefit the higher channel capacity if they are capable of receiving the extended frequency spectrum. It will be understood that the position of the NGSO band related to the GSO band is for illustration only and is not meant to be limiting. In one embodiment (shown in FIG. 6), the NGSO band is above the GSO band. In other embodiment, the NGSO band may be below the GSO band as illustrated in FIG. 8B.

In one embodiment, the satellite may include an on-board control device that may demodulate and decode instructions transmitted from the terrestrial command center. The control device then selects the bandpass filter having the appropriate bandwidth according to the decoded instructions. In another embodiment, the control device may operate autonomously with a control program stored in a memory to select the appropriate bandpass filter directly without the intervention of the command center. This scenario may be realizable when the orbital ephemeris data has been predetermined and no changes in the trajectory of the NGSO satellite constellation and utilized frequency bands will be expected.

Figure 7:
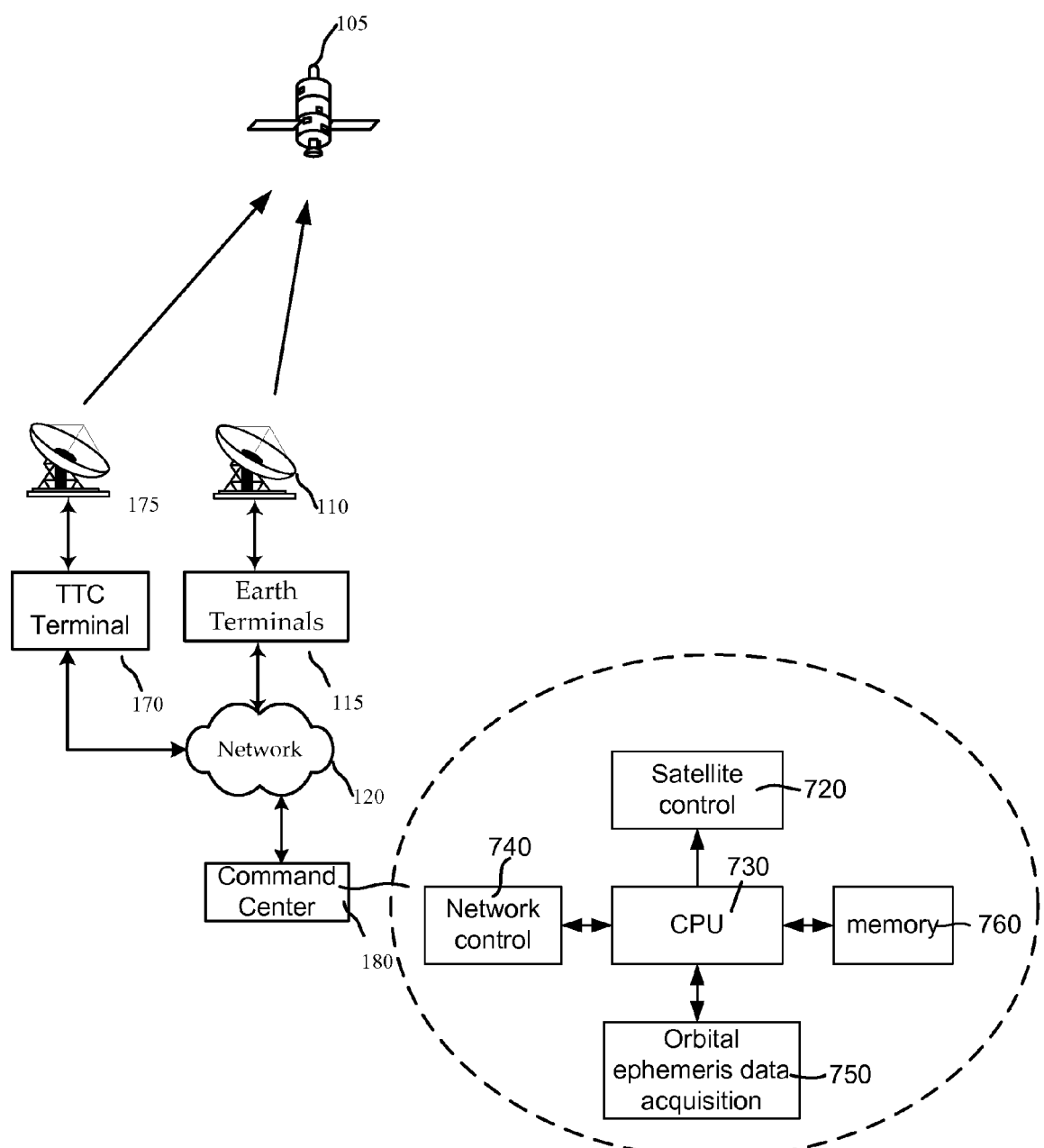
FIG. 7 is an exemplary block diagram of a command center architecture in accordance with one embodiment of the present invention.

Since the orbital position locations of the NGSO satellites relative to the earth and coverage areas are very predictable, the occurrence of the unavailability events are well known and relatively easy to determine by orbit monitoring equipment. Orbit monitoring may be performed at the GSO command center or at a site remote from the command center. In one embodiment, the GSO command center may have the ability to directly provide control to the satellite as well as the ability to provide commands to every GSO Earth terminal connecting to the GSO satellite communication system. In another embodiment, the command center may transmit instructions to the GSO satellite through the use of a GSO Earth terminal participating in the GSO communication network. FIG. 7 illustrates an exemplary block diagram of a GSO command center comprising a central processing unit 730 and a network control unit 740. The central processing unit 730 may be coupled to memory 760. Interference statistics between the GSO satellite link and the NGSO satellite link can be performed by CPU 730 and the results may also be stored in the memory 760. The memory 760 can be in the form of semiconductor storage such as random access memory (static or dynamic RAM), magnetic storage such as hard discs, or other mass storage such as optical discs. CPU 730 is further coupled to an orbital ephemeris data acquisition unit 750 that collects ephemeris data of one or more NGSO satellite constellations. NGSO satellite constellations may include multiple satellites traveling in low earth orbit, medium earth orbit, and/or high earth orbit. CPU 730 may be used to compute the time period where the orbital trajectory of the NGSO satellite constellation may cross the in-line path of the GSO satellite and one of the Earth terminals. The time period when a NGSO satellite of the NGSO constellation may be in-line with the GSO channel with be stored in the memory 760. The CPU 730 may further be connected to a satellite control unit 720 that may communicate with TTC terminal 170 to send commands to satellite 105. The CPU 730 may further be connected to network control unit 740 that is operative to communicate with each of the Earth terminals participating in the GSO satellite communication system. Network communication unit 740 may include a physical layer that supports a set of communication protocols such as point-to-point protocol (PPP), Internet protocol (IP), the transmission control protocol (TCP), a wireless wide area network protocol, a mobile cellular network, and/or a combination of any communication protocols.

In one embodiment of the present invention, right before the onset of an unavailability event, the command center performs the following actions: i) the command center sends a command to the satellite instructing the satellite to utilize the GSO bandwidth filter, i.e., all emissions of the NGSO band will be attenuated below a specified level, and ii) the command center instructs all participating GSO Earth terminals to only transmit signal energy in the uplink GSO uplink spectrum.

Immediately after the unavailability event, the command center performs the following actions: i) the command center instructs the satellite to utilize the wider bandwidth filter that includes the GSO channel and the NGSO frequency band, and ii) the command center instructs all participating GSO Earth terminals in the GSO satellite system to transmit signal utilizing both the GSO and NGSO spectrum.

In one embodiment of the invention, the selection between the allocated primary GSO frequency spectrum and the extended frequency spectrum is performed by a switch. Referring back to FIG. 5, switch 580 may be a PIN diode single-pole double-throw (SPDT) MMIC switch. The desired SPDT switching function can be achieved with a variety of different GaAs PIN diode configurations such as series diodes, shunt diodes, and/or a combination of series and shunt diodes. Switch 580 may also be implemented with a series and a shunt capacitive micro-electro-mechanical systems (MEMS) switch. For example, commercially available high-power SPDT switch vendors for Ka-band are TriQuint Semiconductor and Endware, and an exemplary MEMS switch vendor is Teravicta Technologies. One skilled in the art will recognize that the implementation of switch 580 described herein merely illustrate one embodiment of switch 580 and that alternative constructions and equivalents may be used without departing from the spirit of the invention.

In one embodiment of the present invention, both the GSO and the NGSO satellite systems utilize the Ka-band. Since the Ka-band allocated frequency bands for GSO and NGSO satellite systems are adjacent to each other, extending the filter bandwidth to support the wider spectrum is very straightforward.

In one embodiment, both the GSO and the NGSO satellite systems operate in a Ka-band. In one embodiment, the GSO primary channel frequency spectrum is 28.1 to 28.6 GHz, and the GSO primary downlink channel frequency spectrum is 18.3 to 18.8 GHz. The NGSO uplink channel frequency spectrum is 28.6 to 29.1 GHz and the NGSO downlink channel frequency spectrum is 18.8 to 19.3 GHz. FIG. 8A illustrates the bandpass filter frequency response for the uplink and downlink channels of the GSO satellite communication system using the extended frequency spectrum (including the NGSO frequency spectrum in addition to the GSO frequency spectrum). In this embodiment, the GSO channel spectrum is below the NGSO frequency spectrum, and the second bandpass filter 572 (FIG. 5) will have its bandwidth extended above the GSO spectrum to include the NGSO spectrum.

In another embodiment, the GSO primary uplink channel uses 29.5 to 30.0 GHz, and the GSO primary downlink channel uses 19.7 to 20.2 GHz. The NGSO uplink channel is 28.6 to 29.1 GHz and the NGSO downlink channel is 18.8 to 19.3 GHz. FIG. 8B illustrates the bandpass filter frequency response for the uplink and downlink channels of the GSO satellite communication system using the extended frequency spectrum. In this embodiment, the GSO channel spectrum is above the NGSO frequency spectrum, and the second bandpass filter 572 (FIG. 5) will have its bandwidth extended below the GSO spectrum to include the NGSO spectrum. The NGSO frequency spectrum is in both cases in the proximate range of the GSO frequency spectrum. It will be understood that the frequency spectrums for both GSO and NGSO satellite communication systems are for illustrative purpose only and are not meant to be limiting. In other embodiments, the GSO and the NGSO satellite communication systems may use the Ku-band.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process that is depicted as a flow cart, a structure diagram, or a block diagram. Although they may describe the operations as a sequential process, many of the operations can be performed in parallel or concurrently. In addition, the order of the operations may be re-arranged.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those skilled in the art that various modifications, alternative constructions, and equivalents may be used without departing from the spirit of the invention. For example, the above elements may merely be a component of a larger system, wherein other rules may take precedence over or otherwise modify the application of the invention. Accordingly, the above description should not be taken as limiting the scope of the invention, which is defined in the following claims.

What is claimed is:

1. A geostationary orbit (GSO) satellite for relayed communications comprising:
    an antenna for receiving a spot beam signal from a GSO earth station;

a down converter coupled to the antenna for generating a down-converted signal from the received spot beam signal;

a band-pass filter coupled to the down converter and having a frequency response that allows passing of a signal at least partially occupying a frequency spectrum allocated to a non-geostationary orbit (NGSO) signal on a primary basis, for generating a first output signal based on the down-converted signal; and a switch coupled to the band-pass filter and having a first and a second position, wherein in the first position, the switch permits transmission of the first output signal toward Earth, and wherein in the second position, the switch suppresses transmission of the first output signal toward Earth; and wherein the switch is controllable to be placed in the first or the second position based on information relating to occurrence of an in-line event involving the GSO satellite and an NGSO satellite.

2. The GSO satellite of claim 1, wherein the switch is directly coupled to the output of the band-pass filter, such that in the first position, the switch connects the output of the band-pass filter to an output of the switch, and in the second position, the switch disconnects the output of the band-pass filter from the output of the switch.

3. The GSO satellite of claim 1, further comprising a control device coupled to the switch and operable to place the switch in either the first or the second position.

4. The GSO satellite of claim 3, wherein the control device is operable to place the switch in either the first or the second position based on ephemeris data stored on board the GSO satellite.

5. The GSO satellite of claim 3, wherein the control device is operable to place the switch in either the first or the second position based on an instruction received from a command center on Earth.

6. The GSO satellite of claim 5, wherein the control device includes a demodulator for demodulating the instruction from the down-converted signal.

7. The GSO satellite of claim 5, wherein the control device receives the instruction via a separate telemetry link.

8. The GSO satellite of claim 1, further comprising:

a second band-pass filter coupled to the down converter and having a frequency response that allows passing of a signal not occupying the frequency spectrum allocated to the NGSO signal on a primary basis, for generating a second output signal based on the down-converted signal;

wherein the switch comprises a first input for receiving the first output signal and a second input for receiving the second output signal; and wherein in the first position, the switch produces the first output signal, and in the second position, the switch produces the second output signal.

9. A method for relayed communications using a geostationary orbit (GSO) satellite comprising:

receiving a spot beam signal at the GSO satellite from a GSO earth station;

generating a down-converted signal from the received spot beam signal;

using a band-pass filter having a frequency response that allows passing of a signal at least partially occupying a frequency spectrum allocated to a non-geostationary orbit (NGSO) signal on a primary basis, to generate a first output signal based on the down-converted signal; and using a switch having a first and a second position to control transmission of the first output signal toward Earth, wherein in the first position, the switch permits transmission of the first output signal toward Earth, and wherein in the second position, the switch suppresses transmission of the first output signal toward Earth; and wherein the switch is controllable to be placed in the first or the second position based on information relating to occurrence of an in-line event involving the GSO satellite and an NGSO satellite.

10. The method of claim 9, wherein the switch is directly coupled to the output of the band-pass filter, such that in the first position, the switch connects the output of the band-pass filter to an output of the switch, and in the second position, the switch disconnects the output of the band-pass filter from the output of the switch.

11. The method of claim 9, further comprising a step of using a control device on the GSO satellite to place the switch in either the first or the second position.

12. The method of claim 11, wherein the control device is used to place the switch in either the first or the second position based on ephemeris data stored on board the GSO satellite.

13. The method of claim 11, wherein the control device is used to place the switch in either the first or the second position based on an instruction received from a command center on Earth.

14. The method of claim 13, further comprising a step of demodulating the instruction from the down-converted signal.

15. The method of claim 13, further comprising a step of receiving the instruction via a separate telemetry link.

16. The method of claim 9, further comprising a step of:

using a second band-pass filter having a frequency response that allows passing of a signal not occupying the frequency spectrum allocated to the NGSO signal on a primary basis, to generate a second output signal based on the down-converted signal;

wherein the switch comprises a first input for receiving the first output signal and a second input for receiving the second output signal; and wherein in the first position, the switch produces the first output signal, and in the second position, the switch produces the second output signal.

17. A system for relayed communications using a geostationary orbit (GSO) satellite comprising:

means for receiving a spot beam signal at the GSO satellite from a GSO earth station;

means for generating a down-converted signal from the received spot beam signal;

means for passing of a signal at least partially occupying a frequency spectrum allocated to a non-geostationary orbit (NGSO) signal on a primary basis, to generate a first output signal based on the down-converted signal; and means for switching having a first and a second position to control transmission of the first output signal toward Earth, wherein in the first position, the means for switching permits transmission of the first output signal toward Earth, and wherein in the second position, the means for switching suppresses transmission of the first output signal toward Earth; and means for controlling, to place the means for switching in the first or the second position based on information relating to occurrence of an in-line event involving the GSO satellite and an NGSO satellite.

* * * * *